No. 656,073. Patented Aug. 14, 1900.
R. C. WILSON.
MACHINE FOR HARVESTING SEED FROM CORN, &c.
(Application filed Aug. 5, 1899.)
(No Model.) 4 Sheets—Sheet 1.

Witnesses
F. J. Hartman
Wm. J. Jacob

Inventor
R. C. Wilson
by Jno. Irvine
his Attorney

No. 656,073. Patented Aug. 14, 1900.
R. C. WILSON.
MACHINE FOR HARVESTING SEED FROM CORN, &c.
(Application filed Aug. 5, 1899.)
(No Model.) 4 Sheets—Sheet 2.

Witnesses
R.C. Wilson
Inventor
by
Attorney

No. 656,073. Patented Aug. 14, 1900.
R. C. WILSON.
MACHINE FOR HARVESTING SEED FROM CORN, &c.
(Application filed Aug. 5, 1899.)
(No Model.) 4 Sheets—Sheet 3.

Witnesses
Inventor
R. C. Wilson
by his Attorney

No. 656,073. Patented Aug. 14, 1900.
R. C. WILSON.
MACHINE FOR HARVESTING SEED FROM CORN, &c.
(Application filed Aug. 5, 1899.)
(No Model.) 4 Sheets—Sheet 4.

Witnesses
Inventor
R.C. Wilson
his Attorney

UNITED STATES PATENT OFFICE.

RANSFORD C. WILSON, OF ABILENE, KANSAS.

MACHINE FOR HARVESTING SEED FROM CORN, &c.

SPECIFICATION forming part of Letters Patent No. 656,073, dated August 14, 1900.

Application filed August 5, 1899. Serial No. 726,339. (No model.)

*To all whom it may concern:*

Be it known that I, RANSFORD C. WILSON, a citizen of the United States, residing at Abilene, in the county of Dickinson and State of Kansas, have invented new and useful Improvements in Machines for Harvesting Seed from Corn, &c., of which the following is a specification.

This invention relates more particularly to that class of machines whereby the tops of Kafir corn, broom-corn, and sorghum will be cut off and delivered to a wagon supporting the operating mechanism.

One object of this invention is to provide a mechanism which can be readily attached to and detached from a wagon-body and operated from the carrying-wheels.

A further object is to provide a structure capable of attachment to an ordinary wagon-body, means for cutting the upper ends of the corn, and an endless belt arranged behind the cutters and at an angle thereto, so as to deliver the product to the body of the wagon on which the mechanism is supported.

Many other objects will be hereinafter referred to, and particularly pointed out in the claims.

Figure 1:
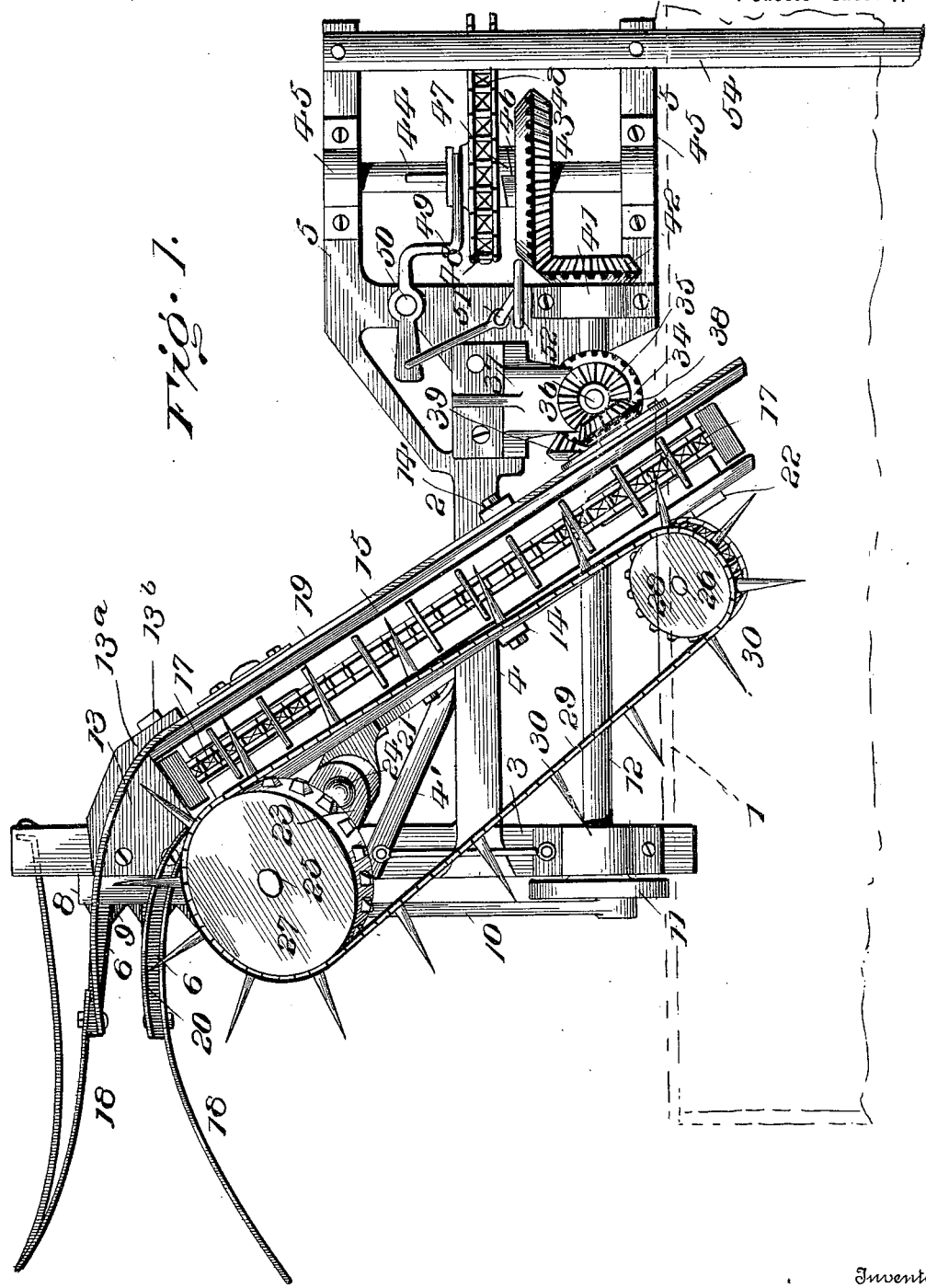
Figure 2:
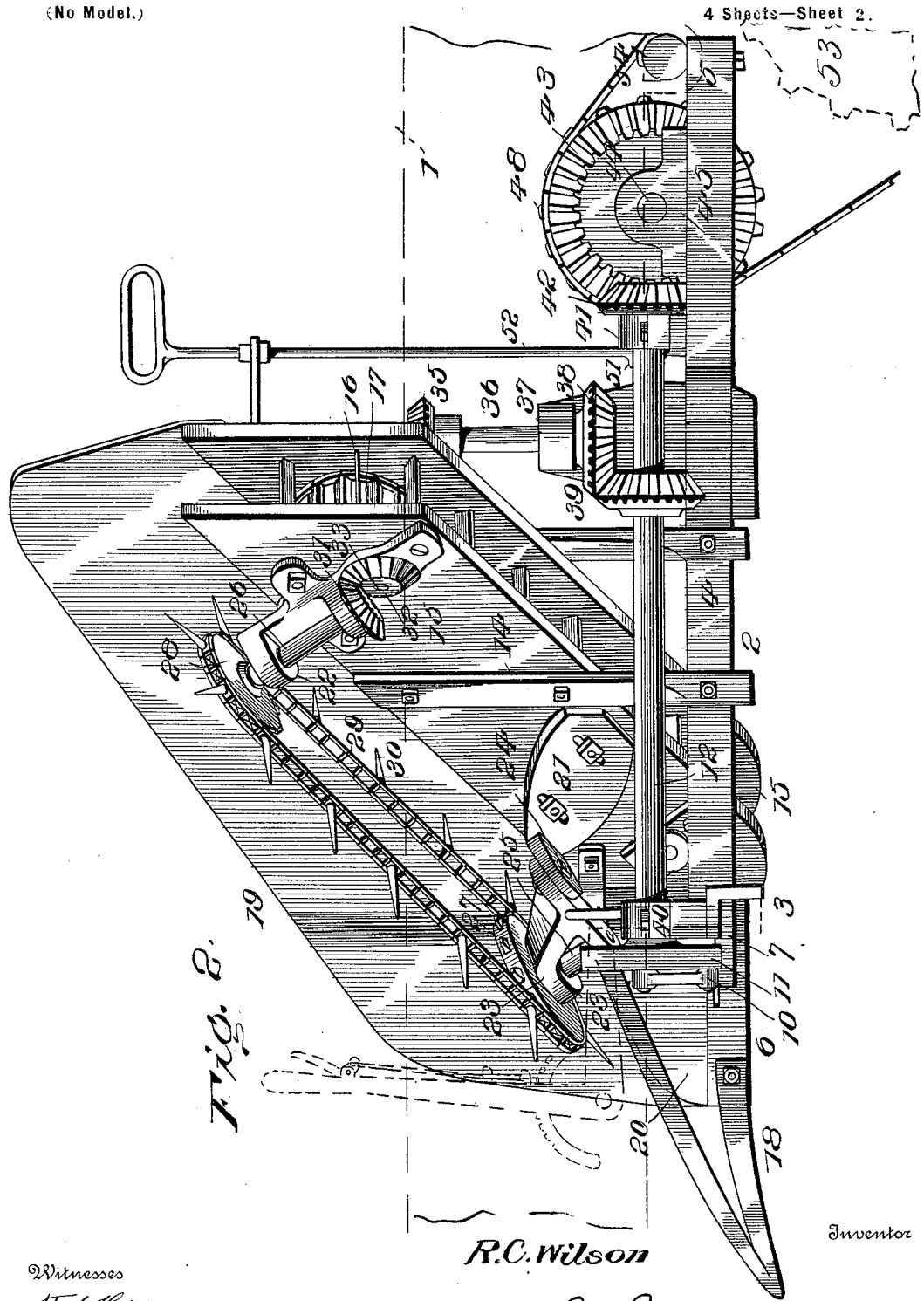
Figure 3:
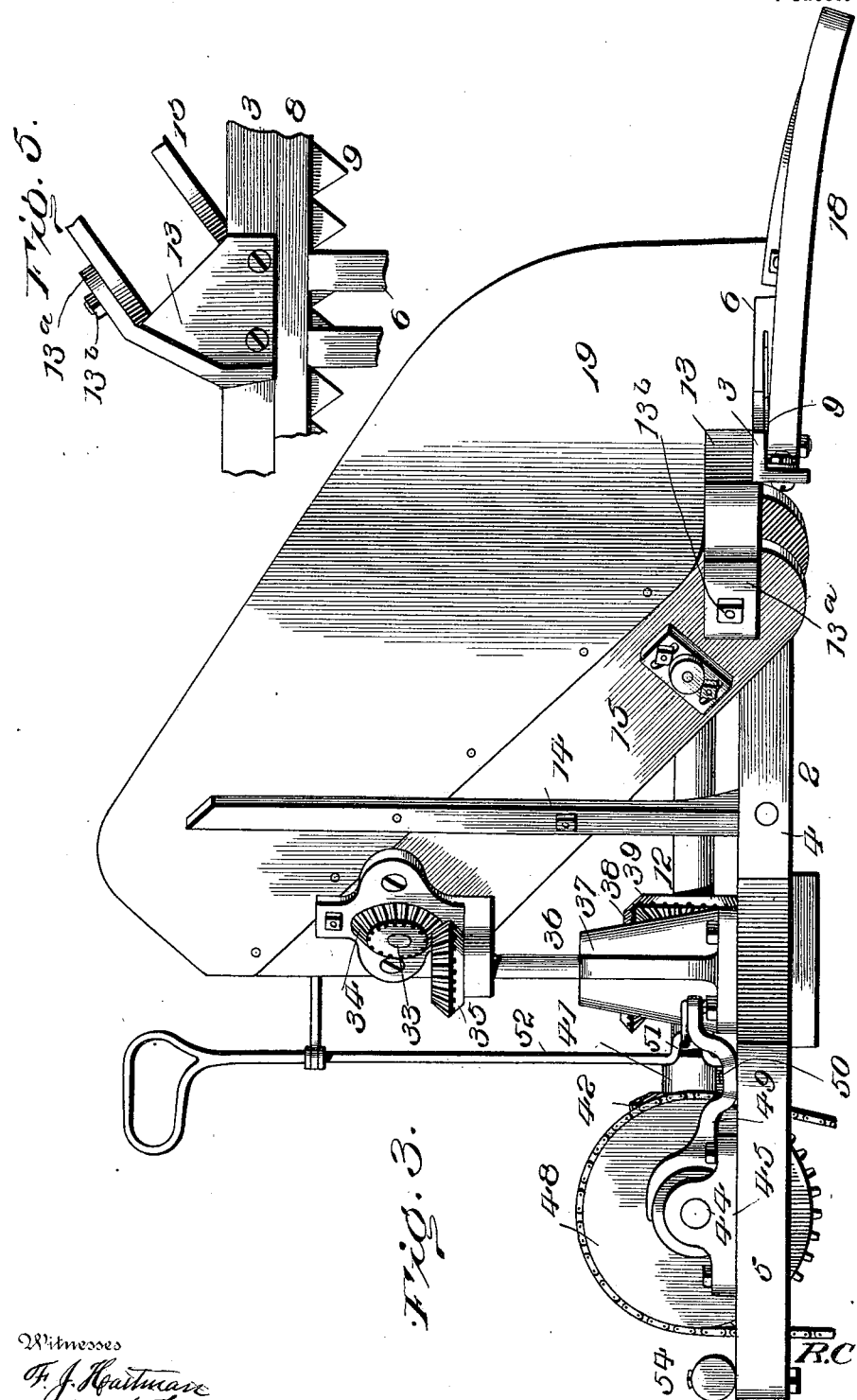
Figure 4:
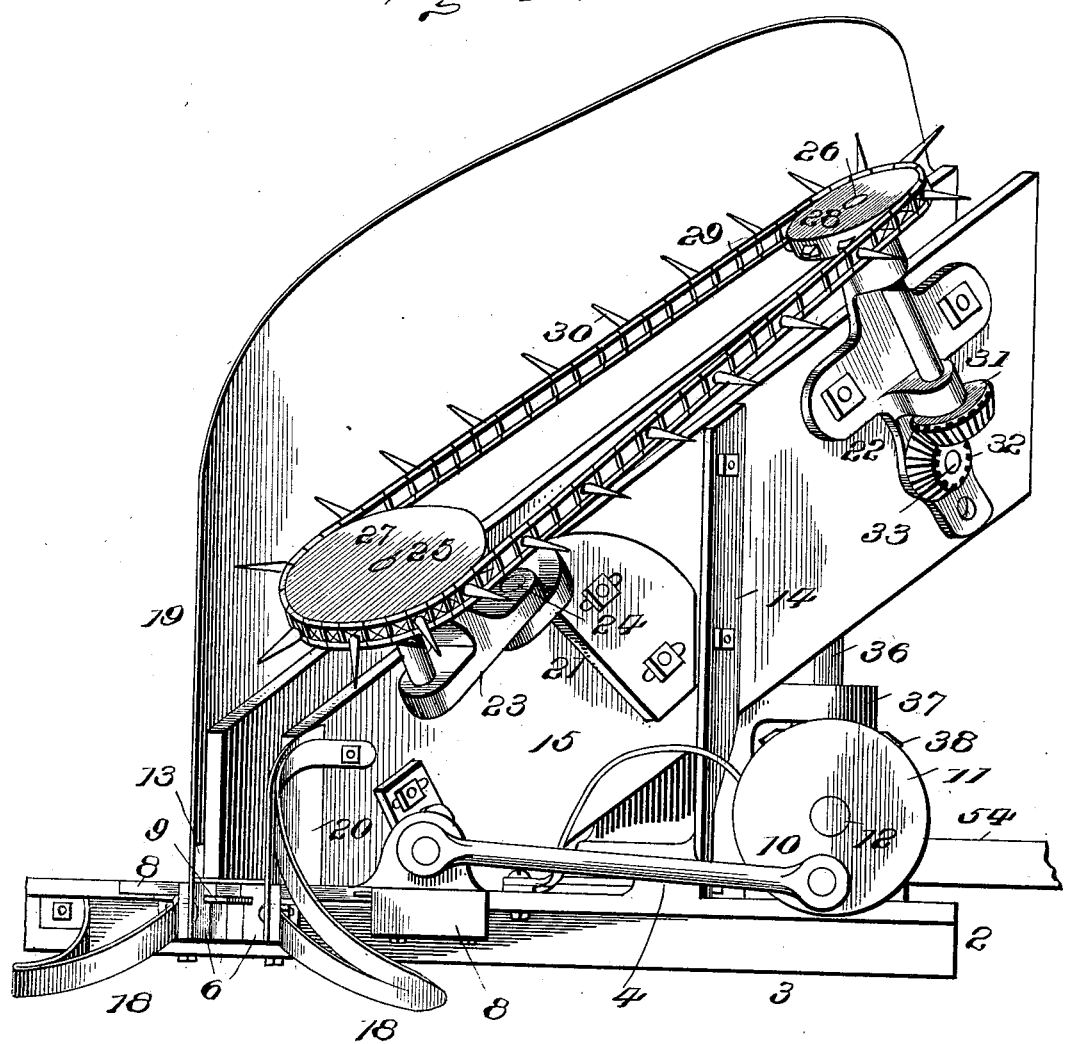

In the drawings forming a part of this specification, Figure 1 is a plan view of my improved apparatus. Fig. 2 is a side elevation of the same. Fig. 3 is a view from the opposite side. Fig. 4 is a front view, and Fig. 5 is a detail view.

The same numerals refer to like parts in all the figures, wherein 1 designates a wagon-body of ordinary construction to which is applied my improved machine.

The numeral 2 designates the bed-frame, composed of a front horizontal bar 3, longitudinal bar 4, the latter broadening out toward the rear end and forming parallel longitudinal bars 5 5. A stay connects the bars 3 and 4, as indicated at 4'. The front bar 3 has projecting forwardly therefrom a pair of supports 6 6. Located on the bar and a short distance from the supports 6 is a guide or support 7, in which and the seats formed in the inner ends of said supports slides a reciprocating cutter-bar 8, having the usual cutting-knives 9. A connecting-link 10 connects the cutter-bar with a crank-disk 11 on the end of a shaft 12, to be hereinafter referred to.

Supported on the bed-frame by a plate 13 and two uprights 14 14 is a supplemental frame 15, between the walls of which is located an endless carrier 16, mounted on rollers 17 17. The frame 15 (for the purpose of illustration I say "in plan view") is placed at an angle to the cutter-bar and the wagon-body. The reason is obvious. The upper end of the frame extends upwardly to a convenient point to drop the products into the body of the wagon. The device for connecting the lower front end of the belt-supporting frame consists of the main flat body portion 13 and a rearwardly-extending flange $13^a$, the body portion terminating a short distance in advance of the rearwardly-extending flange and bolted to the belt-supporting frame by a bolt $13^b$.

Two gathering-arms 18 18, which are continuations of the supports, have one end secured to the outer ends of said supports 6. The opposite ends after extending forwardly and outwardly are bent back and one secured to the front side of the supplemental frame 15 and the other to the front bar 3.

A fender 19 is permanently secured to the rear of the supplemental frame, the same extending forwardly from said frame to the front end of the support 6, where it is secured. A guide 20 is secured to the opposite support 6 and extends up to the front wall of the supplemental frame.

Brackets 21 and 22 are attached to the front of the frame 15, the former so constructed as to be adjustable and having pivoted on the upper end a swinging bracket 23, locked in a given position by a set-screw 24. Mounted in the brackets 21 and 22 are shafts 25 and 26, each carrying sprocket-wheels 27 and 28, around which passes a sprocket-chain 29. The chain 29 has outwardly-projecting fingers or gatherers 30, designed to gather the cut product as soon as it is cut to the carrier-belt, and thus prevent it from falling forward. On the lower end of the shaft 26 is a bevel gear-wheel 31, designed to engage a similar wheel 32 on the end of the shaft 33, supporting the upper roller 17. The opposite end of the shaft 33 has a bevel-gear 34, which meshes with a similar gear 35 on a vertical shaft 36, mounted in a bearing 37, secured to the bar 4. A gear 38 is secured to the lower end of this shaft and meshed with a similar gear 39, secured to the longitudinal shaft 12, the latter being supported in bearings 40 and 41 on the front bar 3 and the enlarged portion of the bar 4. A bevel-gear 42 is secured to the rear end of this shaft and engages a larger gear 43 on a transverse shaft 44, mounted in bearings 45, secured on the arms 5 5. The gear 43 is provided with a clutch-section 46, which engages a similar clutch-section 47, secured to the face of a sprocket-wheel 48, also mounted on the shaft 44. A lever 49, pivoted at 50 to the bed-frame, engages a grooved collar on the wheel 48, the opposite end being in engagement with the crank portion 51 of a vertical operating-handle 52.

A sprocket-wheel 53 is arranged on the wheel of the wagon, and a sprocket-chain engages said wheel and the sprocket-wheel 48.

From the detail description of the location of the various gears it is evident that when motion is imparted to the shaft 44 by reason of the clutch-sections being locked the knives are reciprocated and proper motion is given to the carrier-belt and the gathering-fingers. A bar 54 is secured to the rear ends of the parallel bars 5 5 and affords a means of connecting the mechanism to the wagon-body.

From the foregoing description, taken in connection with the accompanying drawings, it is thought the advantages and operation of my invention will be readily understood by those skilled in the art to which it appertains. As the wagon is drawn over the field alongside a row of broom-corn, Kafir corn, or sorghum the gathering-arms gather it to the cutter-bar, when the upper ends are severed. At about the time the product is cut the gathering-fingers take hold of it and throw it down on the carrier-belt, and it is delivered to the wagon-body.

I would have special attention directed to the relative location of the supplemental frame with relation to the wagon and the bedframe. By the arrangement as fully illustrated in the drawings I am enabled to cut the upper ends of the product to be cut as the wagon is driven through the field on a parallel line with said wagon and at the same time catch and take that which is cut by a single belt or elevator and carry it to a convenient point and drop it in the body of the wagon from which the power is applied to the operating mechanism.

This invention is designed, primarily, for cutting and gathering the upper ends of broom-corn, Kafir corn, and sorghum for seed purposes. As is well known, a large amount of this class of corn is grown exclusively for seed purposes, and it is my intention to apply the machine to this character of harvesting.

Another important feature of my invention resides in the fact that the corn once directed to the knife is bound to be directed to the apron, the traveling gathering-fingers operating on one side of the belt, and the shield, located on the back, prevents it from falling out from the rear.

The front of the machine can be adjusted to accommodate the height of the stalks by manipulating a suitable lever 60, pivoted on the side of the wagon and having a link connection at a suitable point on the machine, all of which is clearly shown in dotted lines in Fig. 2.

Having thus described my invention, what I claim, and desire to secure by Letters Patent, is—

1. In a machine of the class described, the combination of a vehicle, a frame, and mechanism carried thereby, for cutting, elevating and delivering the corn to the vehicle, consisting of a horizontally-vibrated knife, operated by a pitman connected to a horizontal shaft, said shaft being geared by bevel-gears to a shaft, which is clutched to a wheel which receives motion from a wheel of the vehicle supporting the mechanism, a pair of supports 6 6 secured to the front horizontal bar of the frame out from which extend downwardly-projecting gathering-arms, a support secured on the horizontal bar immediately above and behind the aforesaid supports 6 6, to which is secured a belt-supporting frame consisting of two side pieces connected by a horizontal web, vertical rods 14, supporting said belt-frame at the end opposite the front horizontal bar a shield secured to the rear of the frame, said frame positioned in a vertical plane, at an oblique angle to the cutter, an endless carrier mounted on rollers in said frame, a belt passing around suitable wheels mounted on shafts, having bearings secured to the belt-supporting frame, gathering-fingers on said belt, means for tightening said belt, a bevel gear-wheel on the end of the upper shaft supporting the carrier, a similar bevel-wheel on a vertical shaft, meshing with the aforesaid bevel-wheel a bevel-wheel on the lower end of said vertical shaft, which meshes with a bevel-wheel on the horizontal shaft hereinbefore mentioned, all for the purpose as specified.

2. In a machine of the class described, the combination of a vehicle, a frame, and mechanism carried thereby, consisting of a horizontal vibrated knife, operated by a pitman connected to a shaft, means for imparting motion to said knife from a wheel of the vehicle supporting the mechanism, a pair of supports 6 6 secured to the front horizontal bar of the frame, out from which extend downwardly-projecting gathering-arms, a support secured on the horizontal bar immediately above and behind the aforesaid supports 6 6, to which is secured a belt-supporting frame consisting of two side pieces connected by a horizontal web, vertical rods 14, supporting said belt-frame at the end opposite the front horizontal bar, a shield secured to the rear of the frame, said frame positioned in a vertical plane, at an oblique angle to the cutter, an endless carrier mounted on rollers in said frame, a belt passing around suitable wheels mounted on shafts having bearings secured to the belt-supporting frame, gathering-fingers on said belt, means for tightening said belt, a bevel gear-wheel on the end of the upper shaft supporting the carrier, a similar bevel-wheel on a vertical shaft, meshing with the aforesaid bevel-wheel, a bevel-wheel on the lower end of said vertical shaft, which meshes with a bevel-wheel on the horizontal shaft hereinbefore mentioned, all for the purpose specified.

3. In a machine of the class described, the combination of a vehicle, a frame, and mechanism carried thereby, for cutting, elevating and delivering the corn to the vehicle, consisting of a horizontally-vibrated knife, operated by a pitman connected to a horizontal shaft, said shaft being geared by bevel-gears to a shaft, which is clutched to a wheel which receives action from a wheel of the vehicle supporting the mechanism, a pair of supports 6 6 secured to the front horizontal bar of the frame, out from which extend downwardly-projecting gathering-arms, a support secured on the horizontal bar immediately above and behind the aforesaid supports 6 6, to which is secured a belt-supporting frame consisting of two side pieces connected by a horizontal web, vertical rods 14, supporting said belt-frame at the end opposite the front horizontal bar, a shield secured to the rear of the frame, said frame positioned in a vertical plane, at an oblique angle to the cutter, an endless carrier mounted on rollers in said frame, a belt passing around suitable wheels mounted on shafts having bearings secured to the belt-supporting frame, gathering-fingers on said belt, means for tightening said belt, and means for imparting motion to the belt, carrier and horizontally-vibrated knife, substantially as specified.

In testimony whereof I have hereunto set my hand in the presence of two subscribing witnesses.

RANSFORD C. WILSON.

Witnesses:
JON MIDDLETON,
JOHN T. PRENDERGAST.